United States Patent [19]

Armellin

[11] Patent Number: 4,802,520

[45] Date of Patent: Feb. 7, 1989

[54] MOTORCYCLE TIRES

[75] Inventor: Giancarlo Armellin, Nova Milanese, Italy

[73] Assignee: Pirelli Coordinamento Pneumatici S.p.A., Italy

[21] Appl. No.: 56,947

[22] Filed: Jun. 3, 1987

[30] Foreign Application Priority Data

Jun. 9, 1986 [IT] Italy ................. 20716 A/86

[51] Int. Cl.$^4$ .................................. B60C 3/04
[52] U.S. Cl. ............................. 152/454; 152/559
[58] Field of Search ............... 152/209 R, 454, 535, 152/548, 558, 559, 555

[56] References Cited

U.S. PATENT DOCUMENTS

| | | | |
|---|---|---|---|
| 2,703,517 | 3/1955 | Hooper | 152/454 X |
| 3,850,218 | 11/1974 | Bertelli et al. | 152/454 |
| 3,870,095 | 3/1975 | Tangorra | 152/454 |
| 4,042,002 | 8/1977 | Alsobrook | 152/454 |
| 4,112,994 | 9/1978 | Mills et al. | 152/454 X |
| 4,215,735 | 8/1980 | Sato | 152/454 |
| 4,307,767 | 12/1981 | Calori | 152/454 X |
| 4,408,648 | 10/1983 | Ohashi | 152/454 |

FOREIGN PATENT DOCUMENTS

| | | | |
|---|---|---|---|
| 1327812 | 4/1963 | France . | |
| 2415016 | 8/1979 | France . | |
| 59-53204 | 3/1984 | Japan . | |
| 59-84607 | 5/1984 | Japan | 152/454 |
| 2002298 | 2/1979 | United Kingdom . | |
| 2117330 | 10/1983 | United Kingdom . | |

Primary Examiner—Michael W. Ball
Assistant Examiner—Ramon R. Hoch
Attorney, Agent, or Firm—Stevens, Davis, Miller & Mosher

[57] ABSTRACT

The invention concerns a tire, especially suited for motorcycles, that is capable of high performances during racing competitions, due to the high rigidity of the tire-sidewall which permits considerable increase in speed when cornering. The said tire presents, in correspondence of the radially inner portion of the sidewall and in a straight section, the profile of the carcass plies and of the axially inner surface, concave inwardly, together with the profile of the axially outer surface, concave outwardly.

6 Claims, 1 Drawing Sheet

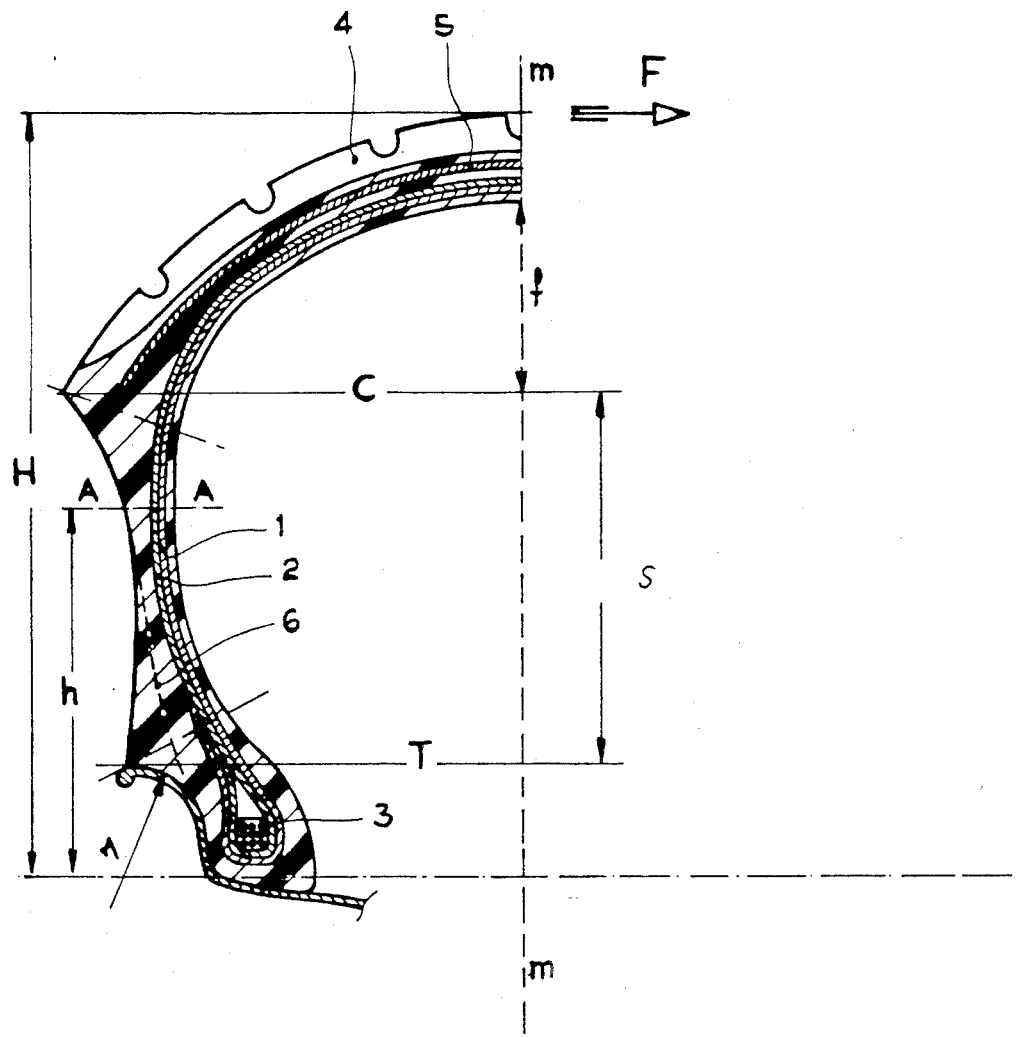

MOTORCYCLE TIRES

DESCRIPTION

The present invention concerns vehicle-wheel tires and it especially applies to those tires intended for two-wheeled vehicles, better known as motor-cycles. In particular, it concerns a tire which is capable of high performances, such as those required during competitive racing.

These tires must have a very special structure for supporting the very critical conditions during use; it is sufficient to consider that they must run with high values of the camber angle, that can reach and even exceed the value of 55°.

It must be remembered that the camber angle is the angle that exists between the meridian plane of the tire inclined on the road (for example, when cornering) and the above-said meridian plane in a vertical position.

Under these working conditions, the tire sidewall has to be very rigid. In fact, when the vehicle rounds a curve at a given speed, the value of the lateral thrust that balances the centrifugal force acting upon the vehicle, depends upon said rigidity of the sidewall.

Therefore, the rigidity of the sidewall determines the maximum velocity that can be developed by the vehicle, during cornering.

Many provisions have been adopted for reinforcing and for stiffening the tire sidewall, in particular by using radially very extended special fabric reinforcements on the tire sidewall with starting from the bead-zone, and-/or with inserting lunette-shaped elastomeric material between the carcass plies or adjacent to them, or under the belt extremities.

Although achieving certain results, such provisions have always involved a considerable complexity in the carcass structure, with increasing the weight of the tire, and hence, with having a greater rotating masses, and difficulty in getting rid of the heat produced, a loss of riding comfort, a negative influence on the tire's driving characteristics and an increase in production costs.

The Applicant has now surprisingly found an extremely simple mode, that is easily realizable and with being devoid of the above-cited defects, for reinforcing the tire sidewall and without undergoing the above-mentioned negative consequences.

Hence, the aim of the present invention is a tire, especially suited for two-wheeled vehicles, provided with a structure that furnishes quite a high value of rigidity to the sidewall and consequently, which permits a greater development of speed during cornering, when compared to the performances had with other normal tires.

Therefore, the object of the present invention, is a tire for vehicle wheels comprising: a textile carcass, a thread-band disposed in the crown zone of said carcass, sidewalls and beads, for anchoring said tire on the corresponding mounting rim, each bead comprising at least one annular, circumferentially inextensible, reinforcing core, said carcass comprising at least one pair of plies with the ends turned-up around said reinforcing cores, said carcass plies presenting on a radial cross-section a curvilinear profile, concave inwardly, the said tire being characterized by the fact that, on said cross-section, in correspondence of the radially inner portion of said sidewall, the profile of the axially outer surface, is concave outwardly.

In any case, the present invention will now be explained in more detail in the following description and illustrated in the attached drawing table, both given solely by way of non-limiting example.

The single FIGURE of drawings is a radial cross sectional view through the tire of the present invention.

The tire of the invention comprises a carcass formed in a manner that is entirely traditional, with at least one pair of crossed-plies 1 and 2, and having its ends turned-up around an annular, circumferentially inextensible, metallic ring 3, usually known as a core.

The reinforcing cords, of the said plies, can be made of any material known in tire technology in particular, rayon, as in the version of the tire shown in the drawing.

Even as far as regards the angular disposition of the above-said cords, this can be according to any known structure already known to the technicians of the field. In particular, referring to the measures taken in the crown in correspondence of the meridian plane m-m, the reinforcing cords which are parallel to one another in each ply and crossed with those in the adjacent ply, can be inclined with respect to the circumferential direction of the tire, according to very high angular values, of not lesser than 75°, with thus realizing a substantially radial structure. Otherwise, they can be inclined according to lower values, however of not lesser than 20°, with realizing a structure having crossed-plies.

The preferred solution chosen by the Applicant, was that having crossed-plies structure, with cords inclined at an angle comprised between 22° and 26° with respect to the outline of the meridian plane, but, in particular, limited to 24°.

In the crown of said tire, there is the normal tread-band 4, provided with a raised pattern for in this way guaranteeing the road-holding ability of the tire, even under wet-road conditions.

Moreover, inserted between the carcass and the tread-band, there can be pre-disposed a breaker structure 5, substantially as wide as the above-said tread-band, and circumferentially and axially inextensible. Even the breaker structure is constructed according to well-known techniques, comprising, in particular, a pair of layers that contain cords which are parallel to each other in each layer and inclined, preferably symmetrically to one another, with respect to the circumferential direction of the tire, according to low values, comprised practically, between 15° and 30°.

Moreover, concerning this breaker structure, the materials used for the reinforcings cords could be all those already known in tire technology, in particular, nylon, metal, aramide fibres. Also regarding the structure, di per se, there can be adopted the geometrical configurations relative to the number and the disposition of the already known layers cited previously.

The profile of the above-said carcass structure it is very arcuate, for the purpose of keeping the tread-band wound around, as in fact, is required for the tires used to equip two-wheeled vehicles.

Substantially speaking, in the tire of the invention, we shall define as being the crown portion that comprised radially, between the ridge point of the tire (intersection of the outer surface with the meridian plane m-m) and the chord C i.e. the axial straight line, in correspondence of which the tire presents its maximum width, and as being the sidewall portion that comprised radially between the above-said chord C and the chord T i.e. the straight line axial and tangent to the vertex of the flanges 7 of the mounting-rim, and to end with, as being the bead portion that comprised radially between the said chord T and the mounting-rim.

Obviously the radial height of the three successive portions corresponds with the section height i.e. to the total radial height H of the tire.

The radial distance f between the chord (C) with a maximum value and the radially inner surface of the tire, in correspondence of the meridian plane m-m, is indicated as being the deflection: for conveninence sake, the tire of the invention has a deflection value comprised preferably, between 20% and 40% of the section height H.

When passing on to examining the sidewall of the tire, we firstly notice the broken-line 6 representing the convex profile of the outer surface, in traditional tires.

The difference is to be seen at once, when compared with the tire of the invention which instead, presents a concave profile that is turned outwardly and extended radially between the end of the thread-band and the extremity of the mounting-rim.

Thanks to this profile, the thickness of the sidewall passes, from a maximum value in correspondence of the end of the tread-band, to a minimum value on the section A—A (always lying in the sidewall's radially outer mid-plane), to thereafter, return to a maximum value, in correspondence of the radially outer surface of the mounting-rim flange.

For the purpose of the present invention, the section A—A of a minimum thickness, divides the tire sidewall into two portions, respectively the radially outer and the radially inner portions, of which, the radially inner forms the innovatory part with respect to the 'known' tires.

In the three points indicated said thicknesses are conveniently measured in the direction perpendicular to the profile of the carcass plies.

The Applicant has found it convenient to keep the minimum thickness, of the tire sidewall, comprised between 1.5 and 2 times the thickness of the carcass plies, with a value of the ratio between the said minimum thickness and the maximum width, comprised preferably, between 0.40 and 0.15.

For preference, the point of the minimum thickness in the tire sidewall, is to be found at a radial height h comprised between 40% and 60% of the total section height H.

The Applicant has obtained particularly brilliant results with the tires according to the invention that have their H/C ratio comprised between 0.70 and 0.80, in view of the fact that the invention results as being applicable advantageously in tire having an H/C ratio comprised between 0.55 and 0.90. Moreover, it has proved convenient to keep the radial development of the sidewall i.e. of the portion comprised between the chords C and T, at a value comprised between 30% and 45% of the height H.

All the above-said values, are meant to be taken on a non-inflated tire. In fact, inflation pressure puts the tire structure into a pre-loaded state, with a tension that is very advantageous for tire behaviour during to. Nevertheless, the form of the originally moulded tire is partially modified, in particular, by annulling the cavities on the sidewalls, that now acquire a substantially rectilinear profile.

The tire of the invention has proved to clearly exceed the limits of the performances as given by tires of the state of the art. In particular, this signifies an unthought-of and unforeseen increase in the sidewall's rigidity with a consequent improved behaviour in respect of the chamber, that has now allowed for tollerating rather higher speeds when cornering, than those speeds possible for the 'known' tires. At the same time, the tire has not at all modified, either its behaviour or its performance, during straight running, even at very high speed, with improving rather, its directional stability, its road- holding capacity and its ready steering-response, at a parity of every other condition, as with respect to the known tires.

Without wanting in any way to limit the scope of the present invention, the Applicant holds that the following theory, that explain the improvement obtained with the tire of the invention.

When a tire is being driven around a curve, with its axis being inclined in respect of the horizontal plane of the road surface, on the crown surface in correspondence of the tire's contact-area, there also acts a tangential thrust F, whose value depends on the camber angle i.e. upon the inclination of the tire axis, that balances the centrifugal force acting on the vehicle.

Through the effect of this thrust, the sidewall of the tire flexes, with determining an axial shifting of the tire-crown, in the direction of F with respect to the mounting-rim.

For facilitating the comprehension of this phenomenon, said problem can be schematized by supposing the tire sidewall to be like a cantilevered beam inserted into one extremity i.e. on the rim, and charged, at the other end i.e. at the radially outermost point having the minimum thickness, with a force F perpendicular to the beam-axis.

In fact, owing to the greater rigidness of the crown portion in respect of the sidewall, the force F is transmitted substantially unaltered in its absolute value and direction, on the sidewall portion that has a minimum thickness.

It is commonly known to the one skilled in the art that, under the said conditions, the beam is subjected to a flexing moment, that has a null value in the point where the force is applied, but which increases gradually up to a maximum value at the point of insertion. Owing to this flexing moment the beam, having a uniform section, undergoes the maximum flexion, in fact, just as occurs to the sidewall of the state of the art tire, with a substantially constant thickness, that flexes due to the force F, resulting as being subjected to the maximum stress-strain, in correspondence of the mounting-rim flange.

For preventing any flexion of the beam, at a parity of all the other conditions, the beam should have a section that progressively increases, by proceeding towards the inserted end, in such a way as to compensate for the increase in the flexing moment, with thus maintaining substantially constant the value of said stress/strain (force/straight section area) on the section of the beam.

The tire of the invention which presents its sidewall-thickness as increasing in the radial direction, inwardly towards the mounting-rim, stands for a good comparison with the above-said beam that has its section augmenting towards the inserted end, and which also behaves in a like manner i.e. flexing to a much lesser degree, at a parity of the applied force F value in known tires. In other words, it results as being a sidewall that is absolutely very rigid and much more rigid than the sidewalls of the known tires, in such a way as to tollerate, at a parity of the flexions, very high values of the thrust F and consequently, to allow for greater speeds, during cornering.

Moreover, it will be obvious that the present description has been given solely by way of non-limiting example and that hence, anyone skilled in the art will have no difficulty in carrying out to it, all those alternative modifications and variations that, though not expressly described, are quite easily deducible from the present inventive idea without in any way, leaving the field of the present patent.

What is claimed is:

1. A tire for two-wheeled vehicle wheels having a deflection value between 0.20 and 0.40 comprising
   a toridal body having a carcass of textile plies, with the sidewalls thereof having a cross-section with an arcuate curvilinear profile that is concave inwardly;
   a tread band disposed in the crown zone of said carcass, sidewalls of varying thickness and beads for positioning said tire on a corresponding mounting rim;
   said sidewalls, radially extending between the extremities of said tread band and the radially outermost surface of said mounting rim having in the uninflated state of the tire an axially external surface of a concave profile, wherein the radial height of said sidewalls is between 30% and 45% of the value of the total height H of said tire, the point of minimum thickness of said sidewalls being at a radial height comprised between 40% and 60% of said total height H, and the ratio between said minimum thickness and the maximum thickness of each sidewall, measured in the direction perpendicular to the profile of said carcass plies, in correspondence of the radially outermost surface of said mounting rim, being between 0.15 and 0.40, whereby in the inflated state of the tire the axially external surface of said sidewall has a substantially rectilinear profile.

2. The tire of claim 1 in which the minimum thickness of said sidewall is comprised between 1.5 and 2 times the thickness of said carcass plies.

3. The tire of claim 1 in which between said treadband and said carcass there is inserted an annular reinforcing structure, that is inextensible circumferentially and axially, and substantially as wide as the treadband, that comprises at least one pair of rubberized layers, provided with reinforcing cords that are parallel to each other in each layer and crossed with the cords of the adjacent layer, said cords being symmetrically inclined with respect of the circumferential direction of the tire, at an angle comprised between 15° and 30°, measured in the tire crown.

4. The tire of claim 1 in which said carcass structure comprises only one pair of crossed plies, the reinforcing cords of said plies being disposed parallel to one another in each ply, and crossed with those of the adjacent ply and symmetrically inclined, with respect to the circumferential direction, at an angle comprised between 22° and 26°, measured in the tire crown.

5. The tire of claim 1 in which said carcass structure comprises only one pair of crossed plies, the cords of said plies being disposed parallel to one another in each ply and crossed with the cords of the adjacent ply, and being inclined with respect to the circumferential direction, at an angle of not less than 75°.

6. The tire of claim 1 in which the H/C ratio value, is comprised between 0.55 and 0.90.

* * * * *